United States Patent [19]

Ogata et al.

[11] Patent Number: 5,292,289

[45] Date of Patent: Mar. 8, 1994

[54] INTERNALLY MESHING PLANETARY GEAR ASSEMBLY

[75] Inventors: Seishiro Ogata, Handa; Atsushi Takahashi; Hideyoshi Tanaka, both of Obu, all of Japan

[73] Assignee: Sumitomo Heavy Industries, Ltd., Tokyo

[21] Appl. No.: 923,920

[22] PCT Filed: Jan. 14, 1991

[86] PCT No.: PCT/JP91/00024

§ 371 Date: Sep. 1, 1992

§ 102(e) Date: Sep. 1, 1992

[87] PCT Pub. No.: WO92/12360

PCT Pub. Date: Jul. 23, 1992

[30] Foreign Application Priority Data

Dec. 8, 1989 [JP] Japan .................. 1-317827

[51] Int. Cl.[5] .................................. F16H 1/32
[52] U.S. Cl. .................................. 475/176; 475/177; 475/904
[58] Field of Search .............. 475/176, 177, 180, 904; 74/640

[56] References Cited

U.S. PATENT DOCUMENTS

| 3,037,400 | 6/1962 | Sundt ...................... 475/176 X |
| 3,668,947 | 6/1972 | Waldorff .................. 475/904 X |
| 4,050,331 | 9/1977 | Braren .................... 475/904 X |
| 4,177,695 | 12/1979 | Grove .................... 475/177 O |
| 4,643,047 | 2/1987 | Distin et al. ............ 74/465 |
| 4,679,465 | 7/1987 | Goto et al. .............. 475/176 X |
| 5,188,572 | 2/1993 | Yamaguchi et al. ......... 475/176 X |

FOREIGN PATENT DOCUMENTS

| 57-36455 | 8/1982 | Japan . |
| 58-77953 | 5/1983 | Japan . |
| 58-42382 | 9/1983 | Japan . |
| 61-140653 | 6/1986 | Japan . |
| 63-13057 | 3/1988 | Japan . |
| 0181641 | 8/1991 | Japan ................. 475/180 |

Primary Examiner—Leslie A. Braun
Assistant Examiner—Daniel Wittels
Attorney, Agent, or Firm—Nikaido, Marmelstein, Murray & Oram

[57] ABSTRACT

A planetary speed-up and -down gearing comprising an external gear having outer teeth (7A) defined by a trochoidal curve and an internal gear having outer pins (9) internally meshed with the outer teeth (7A) of the external gear and being eccentric with respect to the external gear, the external gear and the internal gear being meshed and rotated eccentrically and swingingly relative to each other, so that phases of the external gear and the internal gear are shifted by a difference in the number of teeth between both said gears for each of the eccentric and swinging rotations, to thereby take out, as an output, rotation corresponding to the above difference in phase. Factors such as the radius of a pitch circle of the outer pins (9), the eccentric amount between the external gear and the internal gear, the radius of each outer pin (9), the speed reduction ratio, and the difference in the number of teeth are given a predetermined relationship therebetween, thereby providing a planetary speed-up and -down gearing in which a relative slippage speed in the meshing is reduced and thus a noise level is reduced with the difference in the number of teeth being three or more. Also, by keeping the radius of each outer pin constant and also keeping the number of the outer pins constant, a planetary speed-up and -down gearing is provided in which the same outer pins can be shared by three or more external gears.

2 Claims, 9 Drawing Sheets

FIG. 14
PRIOR ART ered with the external gear. With the external gear kept internally meshed with the internal gear, the external gear is swingingly rotated by an eccentric fitted in the external gear, so that input rotation is outputted while being reduced in speed. The above well-known system is used in a variety of speed-down mechanisms because it can transmit large torque and exhibit a large speed reduction ratio.

INTERNALLY MESHING PLANETARY GEAR ASSEMBLY

BACKGROUND OF THE INVENTION

1. Field Of The Invention

The present invention relates to a planetary speed-up and -down gearing of the internally meshing type. It is to be noted that since a speed-down gearing also serves to increase a speed if the input side and the output side are reversed, the present invention is concerned with a speed-up and -down gearing inclusive of such a speed-up gearing, but the present invention will be explained in connection with only a speed-down gearing in the following description.

2. Description Of Related Art

There have been proposed various speed-down gearings using planetary gear mechanisms of the internally meshing type. Of the proposed speed-down gearings, a well-known planetary one includes an internal gear which has the arch-shaped tooth profile defined by a pin or a combination of a pin and a roller, and an external gear has a trochoidal tooth profile defined by epitrochoidal parallel curves. An inner pin or both the inner pin and an inner roller are loosely fitted with the external gear. With the external gear kept internally meshed with the internal gear, the external gear is swingingly rotated by an eccentric fitted in the external gear, so that input rotation is outputted while being reduced in speed. The above well-known system is used in a variety of speed-down mechanisms because it can transmit large torque and exhibit a large speed reduction ratio.

One example of the known system will be described below with reference to FIGS. 12 to 14.

Figure 12:
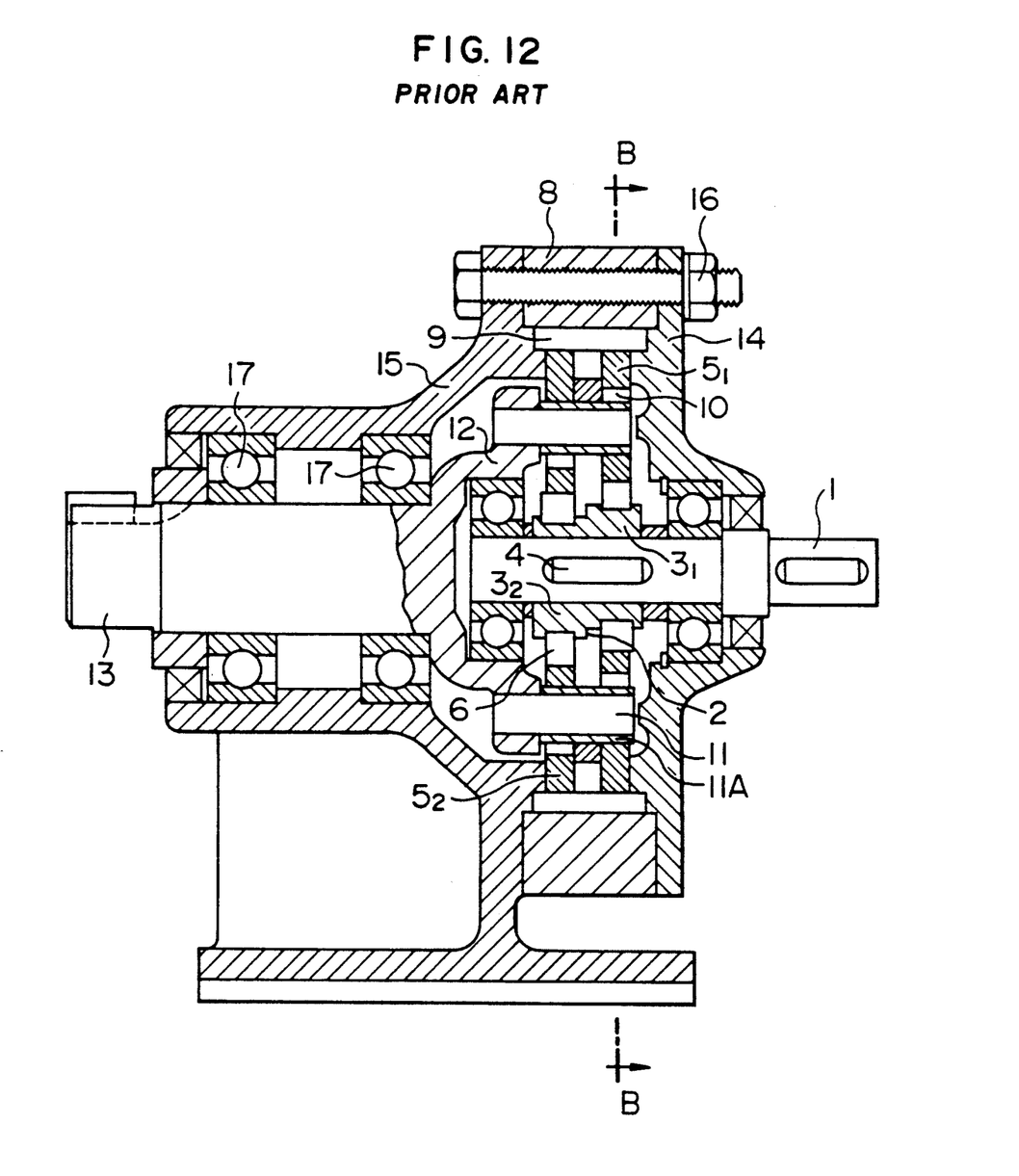
FIG. 12 is a longitudinal sectional view showing one example of a known planetary speed-down gearing.
Figure 13:
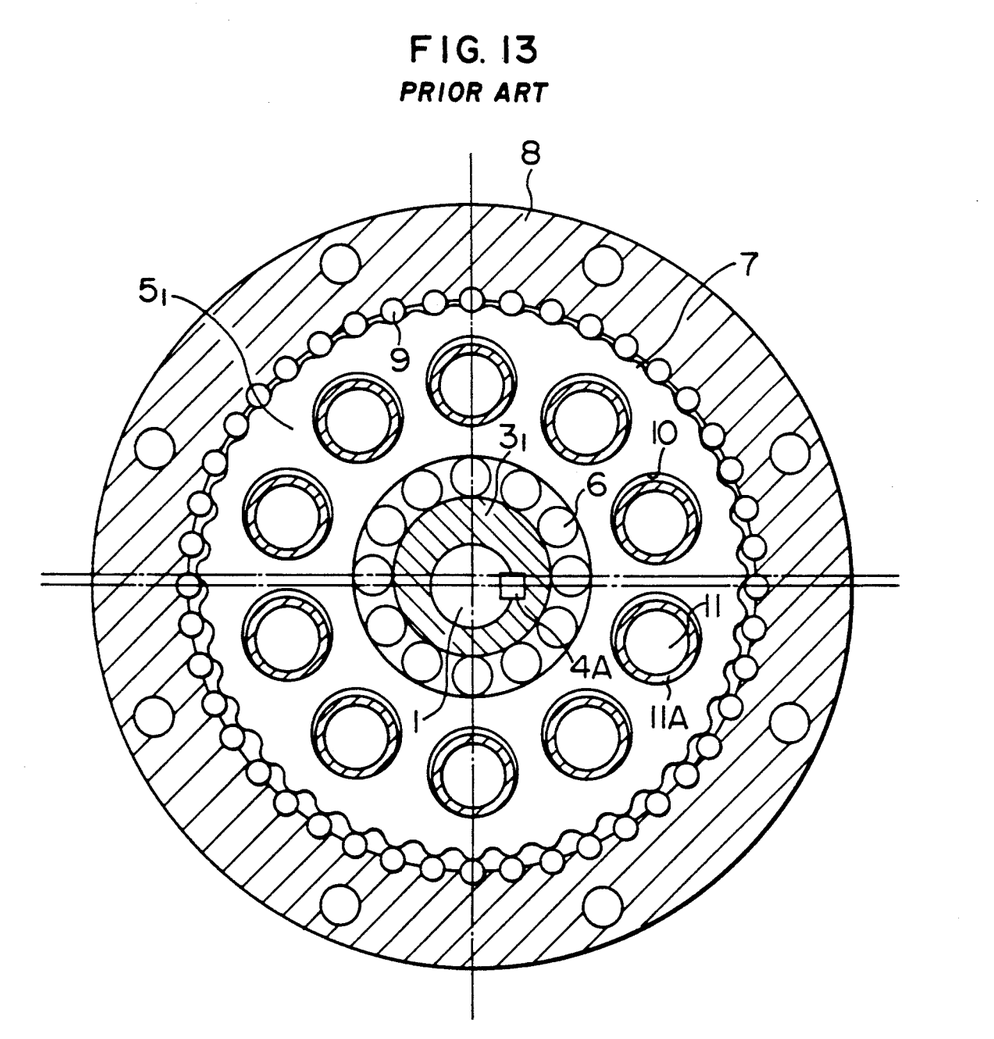
FIG. 13 is a sectional view taken along line B—B in FIG. 12.

FIG. 12 is a sectional view showing one example of the known planetary speed-down gearing and FIG. 13 is a sectional view taken along line B—B in FIG. 12.

An input rotary shaft 1 is inserted in and coupled to a hollow eccentric shaft 2 on which eccentrics $3_1$, $3_2$ are provided. The eccentric shaft 2 has a key way 4 formed in its hollow portion with a key 4A kept inserted in the key way 4. External gears $5_1$, $5_2$ are respectively fitted over the eccentrics $3_1$, $3_2$ through rollers 6. The external gears $5_1$, $5_2$ have outer teeth 7 formed along its outer circumference and having the trochoidal tooth profile. An internal gear 8 doubles as an outer casing and is fixedly provided. The internal gear 8 has the arc-shaped tooth profile defined by outer pins 9 which are internally meshed with the external gears $5_1$, $5_2$. As an alternative structure, if necessary, outer rollers may be loosely fitted over the outer circumferences of the outer pins 9. Inner pin holes 10 are formed in the external gears $5_1$, $5_2$ and inner pins 11 are loosely fitted in the respective inner pin holes 10. Inner rollers 11A are loosely fitted over the respective outer circumferences of the inner pins 11, and the inner pins 11 are tightly fitted to an inner pin holding flange 12. In the above structure, the inner rollers 11A may be dispensed with. The inner pin holding flange 12 is formed integrally with an output shaft 13.

The internal gear 8 is held by a pair of covers 14, 15 from both the sides in a sandwiched manner and fixed in place by bolts 16. Between the output shaft 13 and one cover 15, there are two bearings 17 provided at axially spaced positions.

It is to be noted that although the internal gear 8 is fixed and an output is taken out from the output shaft 13 in the above-mentioned known example, the structure may be modified, on the contrary, in such a manner as to fix the output shaft 13 and take out the rotation of the internal gear 8 as an output.

In the foregoing known example, one rotation of the input rotary shaft 1 corresponds to one rotation of the eccentrics $3_1$, $3_2$. However, the external gears $5_1$, $5_2$ are prevented from rotating about their axes by the inner pin holes 10 and the inner pins 11 so that they rotate swingingly. Assuming that the difference between the number of teeth of the external gears $5_1$, $5_2$ and the number of the outer pins (teeth) 9 is one, therefore, the outer teeth 7 of the external gears $5_1$, $5_2$ and the outer pins 9 as the inner teeth of the internal gear 8 are displaced (or slipped) in their meshing by one tooth for each rotation of the input rotary shaft 1. Accordingly, one rotation of the input rotary shaft 1 is reduced to 1/(the number of teeth) rotation of the external gears $5_1$, $5_2$, while the former's rotation is transmitted to the output shaft 13 through the inner pins 11.

Figure 14:
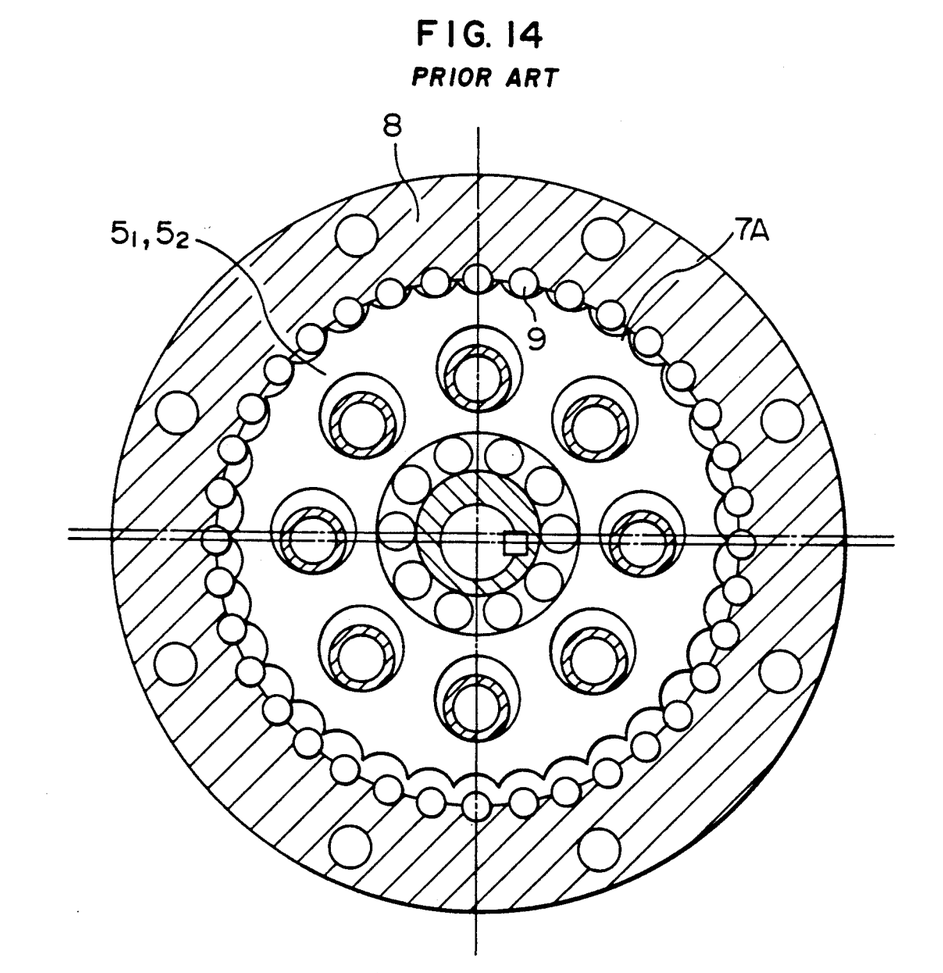
FIG. 14 is a sectional view of another known Cyclo Speed Reducer.

FIG. 14 is a sectional view of the known system as disclosed in Japanese Patent Publication Sho 58-42382 and Japanese Patent Publication Sho 57-36455. In this known Cyclo Speed Reducer, the number of outer teeth of external gears $5_1$, $5_2$ is less the plural than the number of outer pins 9 of an internal gear 8 (the difference in the number of teeth being two in the illustrated example).

In the planetary speed-down gearings explained above, there exists a relative slippage in meshing between the outer teeth 7 of the external gears $5_1$, $5_2$ and the outer pins 9 of the internal gear 8. In practice, because of the outer pins 9 being rotatable about their axes, the internal gear 8 bears such a slippage at both the contact portions for supporting the outer pins and meshing with the outer teeth 7. Anyway, the outer teeth 7 and the outer pins 9 are subjected to a slippage in meshing therebetween. The outer teeth 7 and the outer pins 9 have surface roughness due to limitations in machining accuracy, as a result of which there inevitably give rise to noises at the slipping contact portions.

Furthermore, in the prior known planetary speed-down gearings explained above, since the diameter of each outer pin is made different dependent on the respective speed reduction ratios, parts of the internal gear cannot be shared by different types of gearings. Accordingly, the cost for quality control is increased, erroneous operations are unavoidable in assembly, and a large number of parts to be machined are required, thus resulting in the increased production cost.

SUMMARY OF THE INVENTION

It is therefore an object of the present invention to reduce a relative slippage speed in meshing, thereby reducing a level of noises, and to enable common use of parts of an external gear by utilizing the structure specific to reduce the relative slippage speed.

DESCRIPTION OF THE PREFERRED EMBODIMENTS

With a feature of the present invention to achieve the above object, there is provided a planetary speed-up and -down gearing comprising an external gear defined by the trochoidal curve and an internal gear having outer pins internally meshed with said external gear, said external gear and said internal gear being meshed in such a manner as to rotate eccentrically and swingingly relative to each other, as that phases of said external gear and said internal gear are shifted by a predetermined difference in the number of teeth between both said gears for each of said eccentric and swinging rotations, to thereby take out rotation corresponding to said difference in phase, wherein:

assuming that the radius of a pitch circle of the outer pins of said internal gear is A, the eccentric amount is 8, the radius of each said outer pin is C, the speed reduction ratio is 1, and the difference in the number of teeth between both said gears is N, these factors are set to meet;

$B \times I/A = 0.7$ to $1.5$,
$C/A = 0.02$ to $0.05$,
$C \times I \times N/A = 1$ to $2$, and
N is not less than 3.

The above construction of the present invention realizes the external gear which enables the large eccentric amount, the smaller size of the each outer tooth, and further the E point, which is a maximum point of torque transmission efficiency, to be located near to the root side of the outer tooth. As a result, a relative slippage speed in the meshing can be reduced to achieve a reduction in noises.

Also, with another feature of the present invention, by keeping C constant and also keeping $N \times (I+1)$ constant in the above construction, the outer pins can be shared by three or more external gears, making it possible to remarkably reduce the production cost of internal gears.

BEST MODE FOR CARRYING OUT THE INVENTION

To describe the present invention, torque transmission in a planetary speed-down gearing will be first analyzed below.

Figure 1:
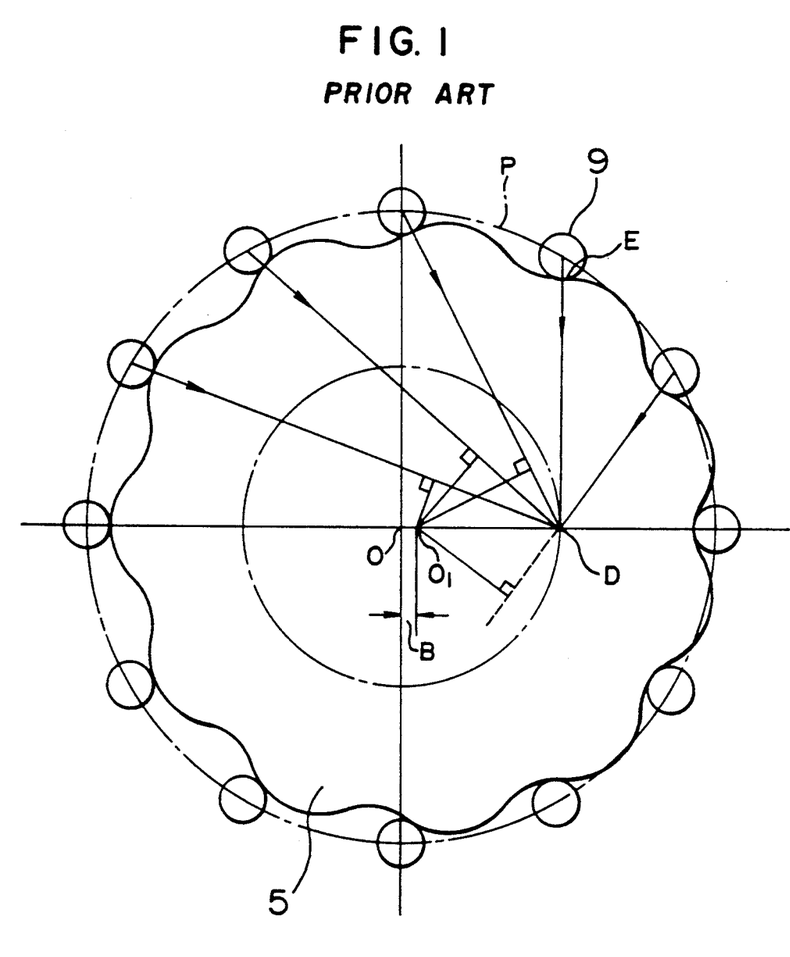
FIG. 1 is a sectional view for explaining torque transmission between an external gear and outer pins of an internal gear.

FIG. 1 is a sectional view for explaining torque transmission between an external gear 5 and outer pins 9.

Referring to FIG. 1, the external gear 5 is held in contact with the outer pins 9 and the center $O_1$ of the external gear 5 is eccentric by B from the center O of a pitch circle P of the outer pins 9. As represented by vectors in the form of arrows in FIG. 1, loads exerted on the tooth surfaces of the external gear 5 act in normal directions at respective contact points and are concentrated to a D point lying on an extension of the line $O—O_1$ in the drawing. In this case, torque of the external gear 5 is expressed by the total sum of products of the respective loads exerted on the tooth surfaces and the lengths of respective lines vertically extending from the center $O_1$ to extensions of the respective load vectors. Accordingly, of the tooth surface loads acting on the D point, the most efficiently acting vector is given by the vector which has the longest vertical line, i.e., which acts perpendicularly to the extension of the line $O—O_1$. In other words, it can be said that the torque is transmitted most efficiently through the meshing at an E point in the drawing. Further, it has been found theoretically and experimentally that meshing load is also in fact enlarged in the vicinity of the E point.

From the above, it can be said that in planetary gear mechanism of the internally meshing type, torque is mainly transmitted through the meshing in the vicinity of the E point.

Meanwhile poises in planetary gear mechanisms of the internally meshing type have been found to occur due to a relative slippage between the external gear 5 and the outer pins 9 in the meshing portions.

Figure 2:
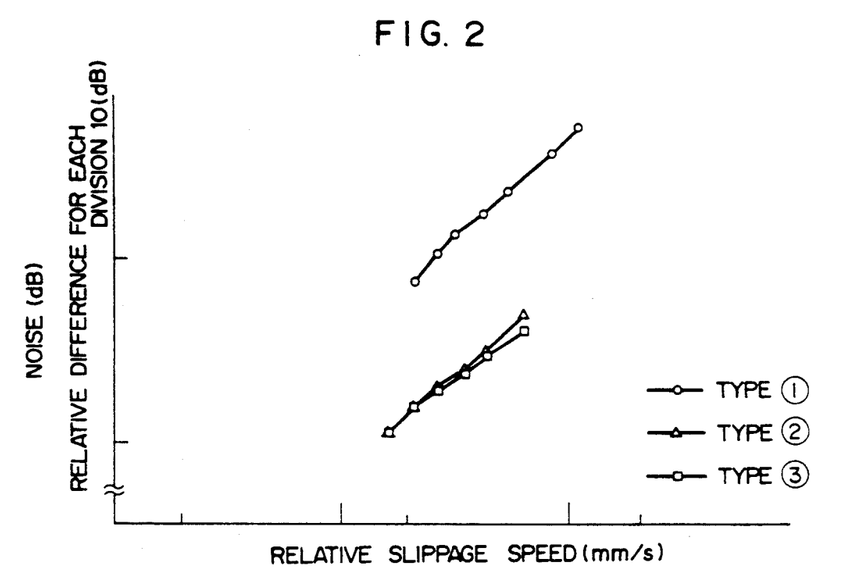
FIG. 2 is a graph of characteristic curves resulted from measuring the relationship between a relative slippage speed (mm/s) and a noise level (dB) for three types of planetary speed-down gearings.

FIG. 2 is a graph of characteristic curves resulted from measuring the relationship between a relative slippage speed (mm/s) and a noise level (dB) for three types of planetary speed-down gearings. In the graph, the axis of ordinate represents the noise level (10 dB for one unit of scale division) and the axis of abscissas represents the relative slippage speed (mm/s) in a logarithmic scale. As will be seen from the graph of FIG. 2, for all the three types, the noise level is reduced at the lower relative slippage speed. It is thus understood that the smaller the relative slippage speed, the lower will be the noise level regardless of any types.

Figure 3:
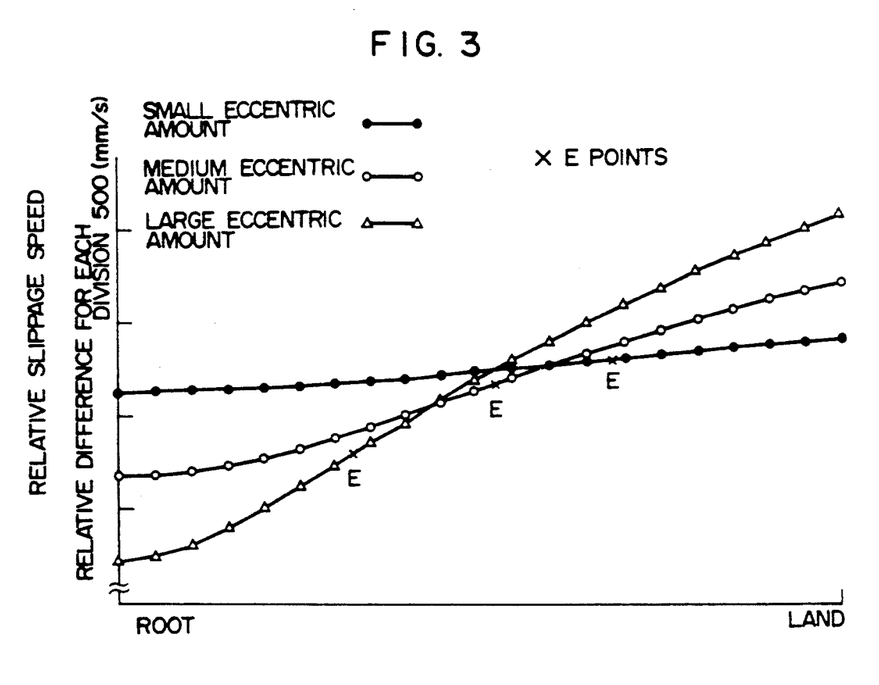
FIG. 3 is a graph of characteristic curves for three types of planetary speed-down gearings with large, medium and small eccentric amounts in which the axis of ordinate represents a relative slippage speed (500 mm/s for one unit of scale division) and the axis of abscissas represents the contour of an outer tooth of the external gear ranging from a root to a land.

In view of the above, analyzing a relative slippage in meshing produced in planetary gear mechanisms leads to the results as shown in FIG. 3.

FIG. 3 is a graph of characteristic curves for three types of planetary speed-down gearings with large, medium and small eccentric amounts in which the axis of ordinate represents a relative slippage speed (500 mm/s for one unit of scale division) and the axis of abscissas represents the contour of an outer tooth of the external gear ranging from a root to a land. (Note that other dimensions than the eccentric amount are constant).

As will be seen from the graph of FIG. 3, the relative slippage speed is smaller in the root side than in the land side and, with the large eccentric amount, the relative slippage speed in the vicinity of the E point which takes an important role in meshing to transmit torque is reduced. It will be also seen that the E point shown in FIG. 1 is displaced toward the root side as the eccentric amount increases.

From the foregoing analysis, it has been proved that noises in the planetary speed-down mechanism can be reduced by making the eccentric amount larger.

However, if the eccentric amount is simply increased, the land size of one outer tooth of the external gear would become too large. There necessarily exists a limitation in enlarging the eccentric amount.

On the other hand, the aforesaid known external gears $5_1$, $5_2$ shown in FIG. 14 in which the difference in the number of teeth with respect to the internal gear is the plural have been found to have a relatively small land size (hereinafter referred to as a tooth height) of one outer tooth 7A.

The aforesaid external gears $5_1$, $5_2$ shown in FIG. 14 in which the difference in the number of teeth with respect to the internal gear is the plural will now be explained.

The tooth profile of the external gear is formed by an epitrochoidal curve. Such an epitrochoidal curve is resulted from a locus drawn by one point on a circle (hereinafter referred to as a rolling circle) which rolls over the circumference of a circle as a base (hereinafter referred to as a basic circle).

Figure 4:
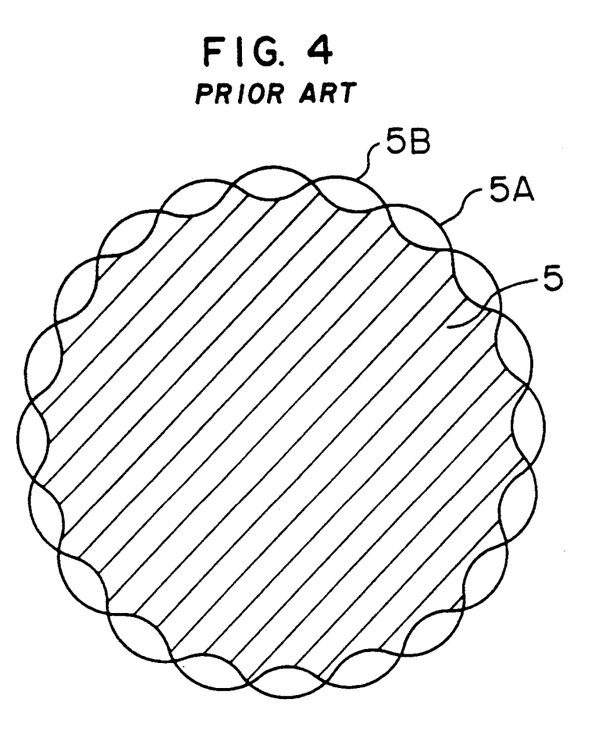
FIG. 4 is a schematic view showing a known external gear in the case where the difference in the number of teeth is two.

External gears 5A, 5B shown in FIG. 4 each correspond to the epitrochoidal curve when the radius ratio of the rolling circle to the basic circle is an integer. In the case where the radius ratio of the rolling circle to the basic circle is an integer like FIG. 4, the rolling circle returns to the original position (start position) after making a turn round the basic circle from the start position. Those two external gears 5A, 5B each having the tooth profile defined by such an epitrochoidal curve are placed in an overlapping manner with their phases shifted from each other, which provides an external gear 5 having the tooth profile defined by the inner curves (i.e., the hatched portion in FIG. 4) of overlapped outer peripheral curves of the two gears. This corresponds to the structure of the external gear, disclosed in the above-referred Japanese Patent Publication Sho 58-42382, in which the difference in the number of teeth is two.

Figure 5:
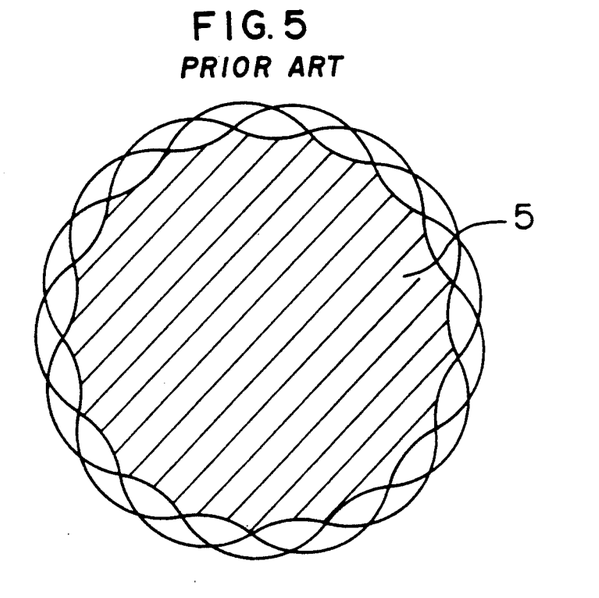
FIG. 5 is a schematic view showing a known external gear in the case where the difference in the number of teeth is three.

Furthermore, the structure of an external gear shown in FIG. 5 is obtained as follows. The radius ratio of the rolling circle to the basic circle is not set to an integer, and an epitrochoidal curve is formed in which the rolling circle returns to the start point (original position) after making three turns round the basic circle. The tooth profile of the external gear 5 is defined by the innermost curves (i.e., the hatched portion in FIG. 5) of three overlapped segments of the epitrochoidal curve. This corresponds to the structure of the external gear, disclosed in the above-referred Japanese Patent Publication Sho 57-36455, in which the difference in the number of teeth is three.

Also in those external gears in which the difference in the number of teeth is the plural, however, if the eccentric amount is simply increased, the tooth height of the external gear 5 would become too large. Therefore, an actual gearing would be impracticable to assemble and thus could be used only in a limited range of the eccentric amount. In the case of the tooth profile which is defined by such a limited range of the eccentric amount, the E point shown in FIG. 1 is displaced toward the land side and, with the difference in the number of teeth being three or more, the E point is so extremely displaced toward the land side as to cause a problem in meshing. For this reason, the difference in the number of teeth must have been set to two in an actual gearing. Accordingly, the relative slippage speed cannot be reduced down to a satisfactory small value in the planetary gear mechanism in which the difference in the number of teeth is two, which has given rise to limitations in reducing a noise level.

Taking into account the state-of-art explained above, the present invention is intended to develop one step the known external gear in which the difference in the number of teeth is the plural, such that the relative slippage speed is reduced and the E point is displaced toward the root side of the outer tooth by increasing the difference in the number of teeth, enlarging the eccentric amount, and reducing both the size of the outer tooth and the diameter of the outer pin, thereby providing a planetary speed-up and -down gearing which has a reduced noise level.

The present gearing will be described below with reference to the drawings.

Figure 6:
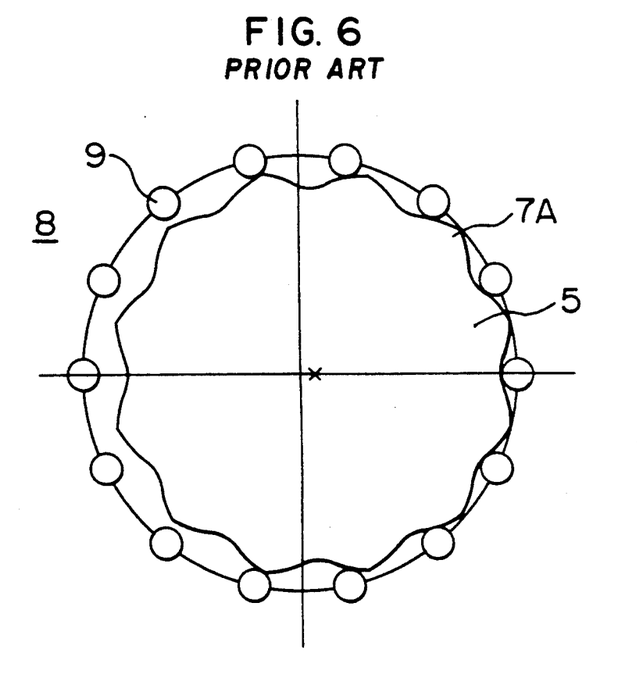
FIG. 6 is a schematic view showing a meshed state of a known planetary speed-down gearing in which the difference in the number of teeth is two.

FIG. 6 shows a conventionally known mechanism in which the difference between the number of the outer teeth 7A of the external gear 5 and the number of the outer pins 9 of the internal gear 8 is two.

Figure 7:
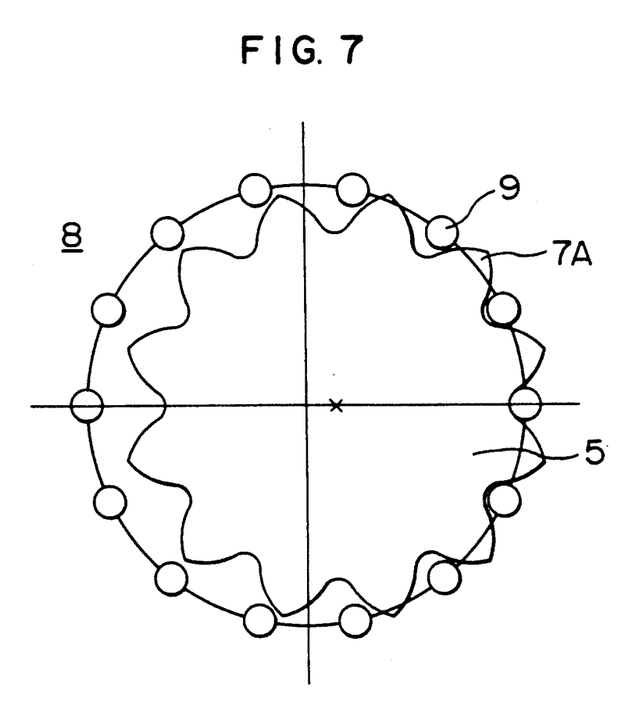
FIG. 7 is an imaginary view of the case where the eccentric amount is increased in FIG. 6.

If the eccentric amount is increased in the known mechanism of FIG. 6, the land of each outer tooth 7A would be so large as to pose difficulties in assembly as shown in FIG. 7. Also, if the number of the outer teeth 7A is increased to make larger the difference in the number of teeth, the E point would be shifted toward the land side of the outer tooth 7A, thus causing a problem in meshing.

Figure 8:
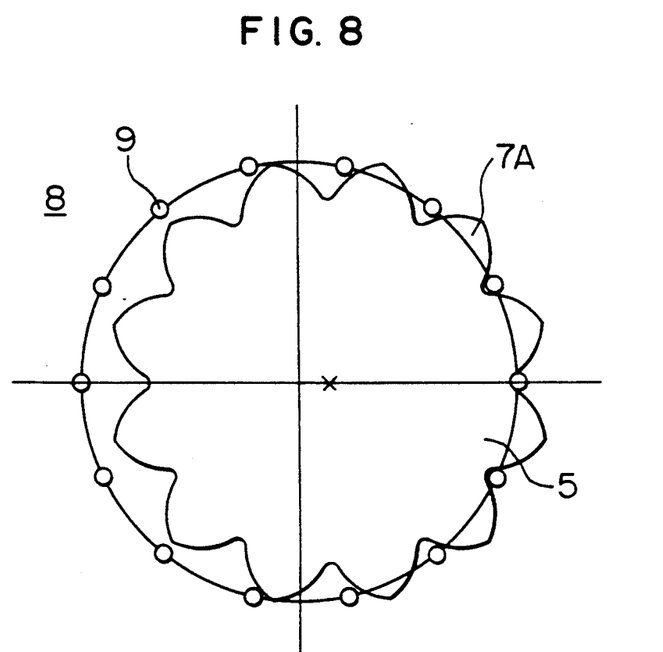
FIG. 8 is an imaginary view of the case where the diameter of each outer pin is reduced in FIG. 7.
Figure 11:
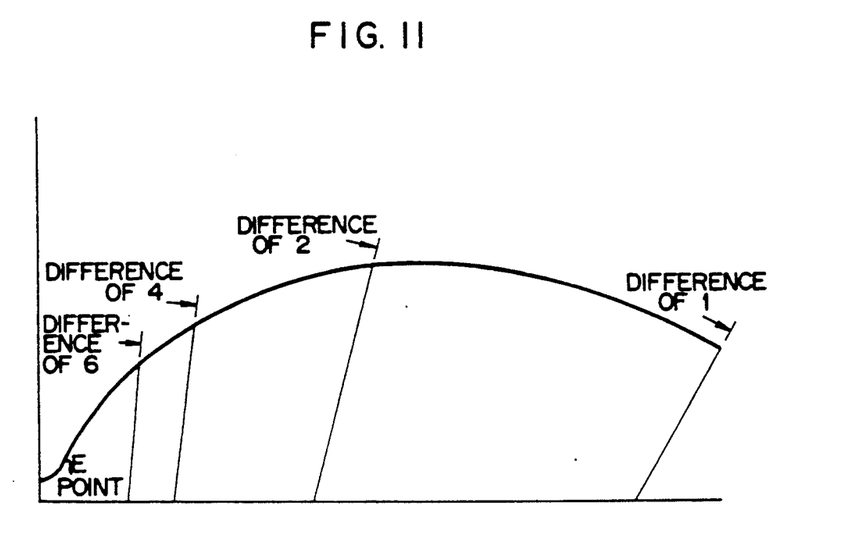
FIG. 11 is a view showing the size of the outer tooth and the position of an E point depending on the difference in the number of teeth.

In view of the above, by reducing the diameter of each outer pin 9 as shown in FIG. 8, the E point can be shifted toward the root side to such a position as causing no problem in meshing, even if the difference in the number of teeth is increased. The positional relationship between this tooth profile and the E point will now be explained by referring to FIG. 11. The tooth profile resulted when the eccentric amount is increased and the outer pins 9 are reduced in diameter as shown in FIG. 8, is expressed by the curve of FIG. 11 in a region nearer to the root side than the line indicated by "difference of 2". The E point is located at a position satisfactorily near to the root side. It is therefore possible to form the external gear in which the difference in the number of teeth is increased so long as there occurs no problem in meshing. In the illustrated example, a limit of the allowable range corresponds to the line indicated by "difference of six". The meshed state between the external gear 5 and the outer pins 9 in this case is as shown in FIG. 9.

Figure 9:
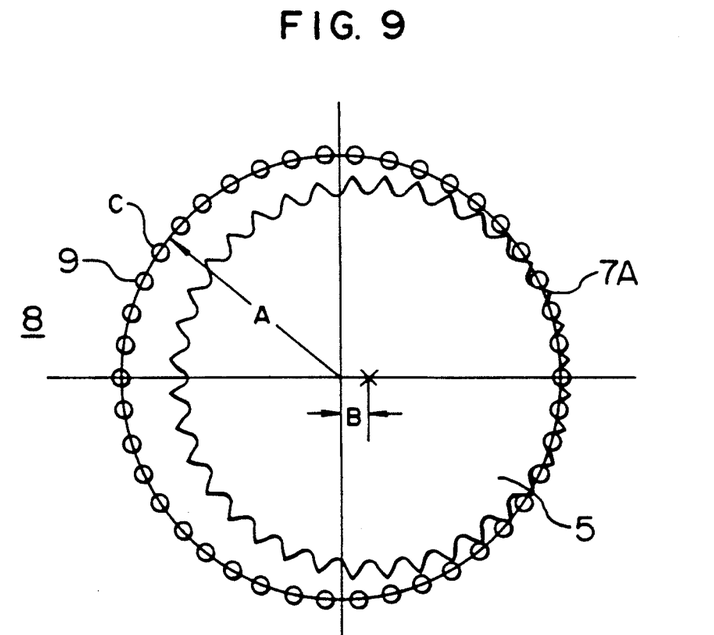
FIG. 9 is a schematic view showing one embodiment of the present invention in which the difference in the number of teeth is set to six.

Dimensions of the above planetary speed-down gearing shown in FIG. 9 are defined to meet the following ranges.

Assuming that the radius of the pitch circle of the outer pins of the internal gear is A, the eccentric amount is B, the radius of each outer pin is C, the speed reduction ratio is 1, and the difference in the number of teeth is N, $B \times I/A = 0.7$ to $1.5$,
$C/A = 0.02$ to $0.05$,
$C \times I \times N/A = 1$ to $2$, and
N is not less than 3.

Figure 10:
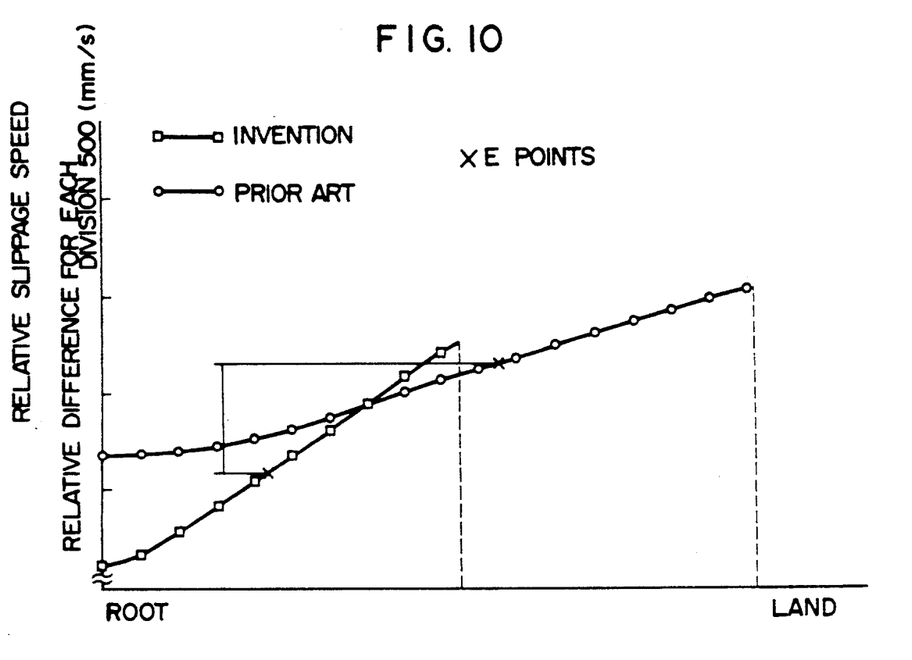
FIG. 10 is a graph of characteristic curves of a relative slippage speed in the embodiment as resulted when the eccentric amount is increased and the difference in the number of teeth is enlarged, in comparison with the prior art.

With the structure of the present invention stated above, as shown in FIG. 10, the relative slippage speed in the vicinity of the E point is reduced to a large extent as compared with that in the conventional structure.

The following is a description about the fact that the internal gear or the outer pins can be shared by different types of gearings by developing a further step the above structure of the present invention.

While the internal gear comprises the frame and the outer pins, common use of the outer pins can be realized by designing the internal gear so that the diameter of each outer pin is held constant.

More specifically, assuming that the radius of each outer pin 9 of the internal gear is C, the speed reduction ratio is 1, and the difference in the number of teeth is N, the outer pins 9 can be shared by three or more internal gears, which has not been feasible up to date, by keeping C constant regardless of any speed reduction ratio and also keeping $N \times (I+1)$ constant. It is thereby possible to remarkably reduce the production cost of internal gears.

When the number of the outer pins is 60, by way of example, those outer pins can be commonly used for ten different speed reduction ratios such as the ratio of 1/59 (where the difference in the number of teeth is 1), the ratio of 1/29 (where the difference in the number of teeth is 2), the ratio of 1/19 (where the difference in the number of teeth is 3), the ratio of 1/14 (where the difference in the number of teeth is 4), the ratio of 1/11 (where the difference in the number of teeth is 5), the ratio of 1/9 (where the difference in the number of teeth is 6), the ratio of 1/5 (where the difference in the number of teeth is 10), the ratio of ¼ (where the difference in the number of teeth is 12), the ratio of ⅓ (where the difference in the number of teeth is 15), and the ratio of ½ (where the difference in the number of teeth is 20).

In the above description, the present invention is not limited to the illustrated planetary speed-down gearing of the internally meshing type, and may include any other types of planetary speed-down gearings in which an external gear defined by the trochoidal curve and an internal gear defined by the arc-shaped contour are swingingly meshed with each other.

INDUSTRIAL APPLICABILITY

According to the present invention, there can be obtained the following advantages.

The relative slippage speed in meshing made in planetary speed-up and -down gearings can be reduced and, correspondingly, the noise level can also be reduced. In this connection, since meshing is effected at multiple points while enlarging the eccentric amount and the E point is located near to the root side of the outer tooth, stability in the meshing is not impaired and transmission of torque is not impeded.

Also, with another aspect of the present invention, since the frame and the outer pins of the external gear can be commonly used, the cost for quality control is reduced and erroneous operations are avoided in assembly. In addition, the number of parts to be machined is required not to be so large, making it possible to suppress an increase in the production cost.

We claim:

1. A planetary speed-up and -down gearing comprising an external gear defined by a trochoidal curve and an internal gear having outer pins internally meshed with said external gear, said external gear and said internal gear being meshed in such a manner as to rotate eccentrically and swingingly relative to each other, so that phases of said external gear and said internal gear are shifted by a predetermined difference in the number of teeth between both said gears for each of said eccentric and swinging rotations, to thereby take out rotation corresponding to a difference in phase caused by the predetermined difference in the number of teeth, wherein when a radius of a pitch circle of the outer pins of said internal gear is A, the eccentric amount is B, the radius of each said outer pin is C, the speed reduction ratio is I, and the difference in the number of teeth between both said gears is N, these factors are set to meet;
$B \times I/A = 0.7$ to $1.5$,
$C/A = 0.02$ to $0.05$,
$C \times I \times N/A = 1$ to $2$, and
the difference in the number of teeth N is not less than 3.

2. A planetary speed-up and -down gearing comprising an external gear defined by a trochoidal curve and an internal gear having outer pins internally meshed with said external gear, said external gear and said internal gear being meshed in such a manner as to rotate eccentrically and swingingly relative to each other, so that phases of said external gear and said internal gear are shifted by a predetermined difference in the number of teeth between both said gears for each of said eccentric and swinging rotations, to thereby take out rotation corresponding to a difference in phase caused by the predetermined difference in the number of teeth, wherein when a radius of a pitch circle of the outer pins of said internal gear is A, the eccentric amount is B, the radius of each said outer pin is C, the speed reduction ration is I, the number of outer pins is S, and the difference in the number of teeth between both said gears is N, these factors are set to meet;
$C$ = constant, and
$N \times (I+1) = S$,
thereby commonly using three or more internal gears.

* * * * *